US007729004B2

(12) United States Patent
Currans et al.

(10) Patent No.: US 7,729,004 B2
(45) Date of Patent: Jun. 1, 2010

(54) PRINT JOB MANIFEST

(75) Inventors: Kevin G. Currans, Philomath, OR (US); Arne D. Thormodsen, Corvallis, OR (US); John V. Peterson, Corvallis, OR (US); Steve Morris, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1328 days.

(21) Appl. No.: 11/193,759

(22) Filed: Jul. 29, 2005

(65) Prior Publication Data

US 2007/0022892 A1 Feb. 1, 2007

(51) Int. Cl.

| | |
|---|---|
| ***G06F 3/12*** | (2006.01) |
| ***G06F 15/76*** | (2006.01) |
| ***G06K 1/00*** | (2006.01) |
| ***G06K 15/02*** | (2006.01) |
| ***H04N 1/23*** | (2006.01) |
| ***B41L 47/46*** | (2006.01) |
| ***B65B 63/04*** | (2006.01) |

(52) U.S. Cl. ........................ 358/1.18; 358/1.1; 358/296; 358/449; 358/401; 101/483; 101/92; 399/375; 399/384; 399/386; 53/430; 53/118

(58) Field of Classification Search ................. 400/611, 400/613, 621; 347/104; 399/387, 375, 384, 399/386; 206/389, 395, 396, 397; 53/118, 53/430; 101/92; 358/1.18
See application file for complete search history.

(56) References Cited

U.S. PATENT DOCUMENTS

| | | | | | |
|---|---|---|---|---|---|
| 2,427,611 | A | * | 9/1947 | Lane | 346/24 |
| 3,735,862 | A | * | 5/1973 | Nimmo, Jr. | 206/394 |
| 3,958,224 | A | | 5/1976 | Boyd et al. | |
| 4,310,844 | A | | 1/1982 | Imamoto | |
| 4,329,693 | A | | 5/1982 | Goldschmidt et al. | |
| 4,505,387 | A | * | 3/1985 | Seto | 206/414 |
| 4,688,368 | A | * | 8/1987 | Honegger | 53/399 |
| 4,839,829 | A | | 6/1989 | Freedman | |
| 4,844,256 | A | * | 7/1989 | Honegger | 206/390 |
| 5,022,523 | A | * | 6/1991 | Honegger | 206/390 |
| 5,043,749 | A | | 8/1991 | Punater et al. | |
| 5,517,803 | A | * | 5/1996 | Stauber | 53/399 |
| 5,704,602 | A | | 1/1998 | Taylor et al. | |
| 5,754,434 | A | | 5/1998 | Delfer et al. | |
| 5,794,236 | A | | 8/1998 | Mehrle | |
| 6,348,940 | B1 | | 2/2002 | Sano et al. | |
| 6,650,433 | B1 | | 11/2003 | Keane et al. | |
| 2002/0034392 | A1 | | 3/2002 | Baum et al. | |
| 2003/0183147 | A1 | | 10/2003 | Bondanza et al. | |
| 2004/0003342 | A1 | | 1/2004 | Keane et al. | |
| 2004/0214707 | A1 | | 10/2004 | Stocklossa et al. | |
| 2005/0044476 | A1 | | 2/2005 | Bursten | |

FOREIGN PATENT DOCUMENTS

| | | |
|---|---|---|
| JP | 04014180 | 1/1992 |

* cited by examiner

*Primary Examiner*—Twyler L Haskins
*Assistant Examiner*—Myles D Robinson

(57) ABSTRACT

A method for providing a print job manifest includes querying a press database containing data corresponding to print jobs recorded on a web. A print job manifest is generated according to the press database. The print job manifest is recorded on the web so that at least a portion of the manifest is located generally adjacent to a loose end of the web when the web is wound to form a roll.

27 Claims, 8 Drawing Sheets

32

| ROLL (48) | JOB (52) | PARAMETERS (54) | FINISHING (56) | ERRORS (58) |
|---|---|---|---|---|
| ROLL (1) | JOB (1,1) | PARAMETERS (1,1) | FINISHING (1,1) | ERRORS (1,1) |
| | JOB (1,2) | PARAMETERS (1,2) | FINISHING (1,2) | ERRORS (1,2) |
| | *** | *** | *** | *** |
| | JOB (1,n) | PARAMETERS (1,n) | FINISHING (1,n) | ERRORS (1,n) |
| ROLL (2) | JOB (2,1) | PARAMETERS (2,1) | FINISHING (2,1) | ERRORS (2,1) |
| | JOB (2,2) | PARAMETERS (2,2) | FINISHING (2,2) | ERRORS (2,2) |
| | *** | *** | *** | *** |
| | JOB (2,n) | PARAMETERS (2,n) | FINISHING (2,n) | ERRORS (2,n) |
| *** | *** | *** | *** | *** |
| ROLL (m) | JOB (m,1) | PARAMETERS (m,1) | FINISHING (m,1) | ERRORS (m,1) |
| | JOB (m,2) | PARAMETERS (m,2) | FINISHING (m,2) | ERRORS (m,2) |
| | *** | *** | *** | *** |
| | JOB (m,n) | PARAMETERS (m,n) | FINISHING (m,n) | ERRORS (m,n) |

50 46

FIG. 4

PRINT JOB MANIFEST

BACKGROUND

A digital press can be equipped to record images on a web as the web is drawn from a supply reel and wound unto a take-up reel. Each image is part of a print job received by the press. For example, a print job may include electronic data for producing a selected number of copies of a book. Each image, then, could be a page of that book. Once the press records each print job—the roll formed at the take-up reel can be removed and passed through one or more finishing operations that can include cutting and binding.

Except for the outer exposed surface, a press operator or other user looking at the roll on the take-up reel cannot visually identify the print jobs recorded on that roll. To assist a user responsible for a finishing operation, the contents of a roll can be manually recorded on a separate sheet of paper that follows the roll. This adds extra work for the press operator and is subject to error and if detached, can easily be separated from the contents it represents.

DRAWINGS

FIG. 4 is a table illustrating the logical structure of an exemplary press database according to an embodiment.

DETAILED DESCRIPTION

INTRODUCTION: Various embodiments described below operate in an automated fashion to produce a print job manifest at or near the loose end of a web wound to form a roll. A print job manifest is information related to the print jobs recorded on a web. That information can take varying forms. For example, one print job manifest may include a name for and characteristics of each print job. Another print job manifest might include instructions for other information related to finishing operations to be performed. Another print job manliest might include a description of any errors incurred when recording print jobs on the web. A print job manifest may even include a bar code or other machine readable code that can be scanned or otherwise read to gain access to an electronic database containing the same and/or different information.

The manifest helps reduce the need for a press operator to manually record the print job information in a separate log that accompanies the roll. The placement of the manifest allows the user to access the manifest without unrolling the web. For example, a bindery operator can access a roll that has a print job manifest produced at or near the end of the roll. That manifest may contain the names of the jobs printed on that roll as well as information used to determine which materials (covers, customized inserts, etc.) will be needed in the finishing of the print jobs on the roll. The Manifest may also provide information regarding the number of copies to expect, the size of the various print jobs on the roll, as well as information describing any errors in the roll. The print job manifest will allow a user such as a bindery operator to gather such important information without accessing a computer terminal and without examining the roll's contents or a manually generated log.

The following description is broken into sections. The first section, labeled "environment" describes an exemplary computing environment in which embodiments may be implemented. The second section, labeled "components," describes exemplary logical and physical components used to implement various embodiments. The third section, labeled "operation," describes exemplary method steps for implementing various embodiments.

Figure 1:
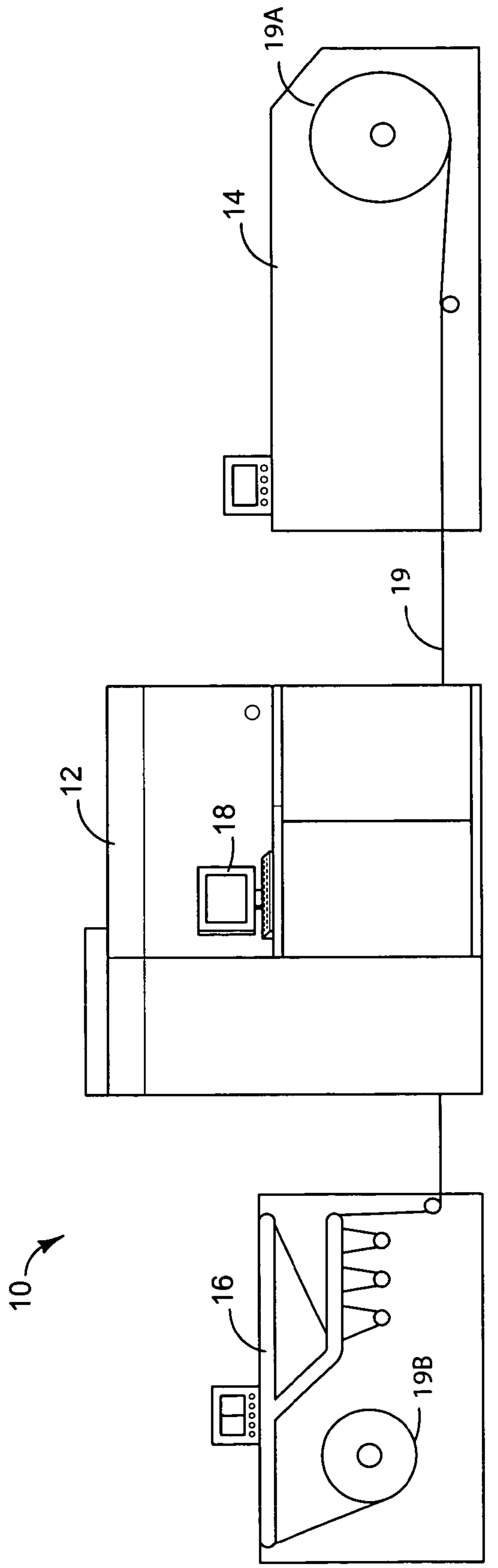
FIG. 1 is a schematic view of a digital press in which various embodiment may be implemented

ENVIRONMENT: Although the various embodiments of the invention disclosed herein will be described with reference to the digital press 10 shown in FIG. 1, the invention is not limited to use with digital press 10. The invention may be implemented in any environment in which print jobs are produced on a web. Referring to FIG. 1, digital press 10 represents generally any image forming device capable of producing print jobs on a web where that web can be wound to form a roll.

In the Example of FIG. 1, digital press includes imager 12, web supply 14, and web take-up 16, user interface 18, and web 19. Imager 12 represents generally any combination of hardware and programming capable of forming print jobs on web 19. Web supply 14 represents generally any combination of hardware and/or programming capable of supplying web 19 for use by imager 12. Web take-up represents generally any combination of hardware and/or programming capable of collecting web 19 as it is being used by imager 12. In the example shown, web supply 14 is configured to hold a web wound for form a supply roll 19A, while web take-up is configured to wind web 19 to form a finished roll 19B.

Once imager 12 has formed all the print jobs on web 19, imaged roll 19B may be removed and taken to a finishing apparatus (not shown) for further processing. If supply roll 19A has not been depleted, web 19 may be cut at a point following the final print job formed by imager 12. The imaged roll 19B will then have a loose end. It is at or near this end that imager 12 will form a print job manifest according to various embodiments described below.

COMPONENTS: The logical components of various embodiments will now be described with reference to the exemplary block diagram of FIG. 2. In this example, Imager 12 is shown to include user interface 18, print engine 20, sensor 24A, web logic 26, print logic 28, sensor logic 30, press database 32, manifest logic 34, communication interface 36, communication logic 38, and processor 40. Web supply 14 includes web supply roll 19A and sensor 24B. Web take-up 16 includes imaged roll 19B and sensor 24C.

User interface 18 represents generally any combination of hardware capable of enabling an operator to enter instructions for guiding the operation of digital press 10 and for providing the operator with information with respect to the operation of digital press 10. Print engine 20 represents generally any combination of hardware capable of recording the images of print jobs on web 19 as web 19 passes through imager 12.

Sensors 24A, 24B, and 24C represents generally any sensors capable of being used to detect errors in the supply of web 19, the recording of print jobs by print engine 20, and the take-up of web 19. Web logic represents generally a computer readable medium containing any combination of program instructions for guiding the operation of web supply 14 and web take-up 16. Print logic 28 represents generally a computer readable medium containing any combination of program instructions for guiding the operation of print engine 20. Sensor logic 30 represents generally a computer readable medium containing any combination of program instructions for guiding the operation of sensors 24A, 24B, and 24C.

Press database 32 represents generally a computer readable medium to which manifest data can be stored. Manifest data includes any information that can be used to generate a print job manifest for web 19. Manifest logic 34 represents generally a computer readable medium containing any combination of program instructions for writing manifest data to and reading manifest data from press database 32. Manifest logic 34 is responsible for obtaining data written to press database 32 from web logic 26, print logic 28, sensor logic 30, and communication logic 38. Manifest logic 34 is also responsible for creating a print job for a print job manifest according to the manifest data contained in press database 32 and to pass that print job on to print logic 28 so that it can be recorded on web 19.

Communication interface 36 represents generally any combination of hardware capable of serving as an interface between digital press 10 and other computing devices (not shown). For example, digital press 10 may be part of a computer network. Communication interface may for example be an Ethernet port for connecting digital press 10 to that network. Communication logic 38 represents generally a computer readable medium containing any combination of program instructions for utilizing communication interface 36.

Processor 40 represents generally any processor or combination of processors capable of executing the program instructions of WEB logic 26, print logic 28, sensor logic 30, manifest logic 34, and communication logic 38. Executing those instructions, processor 40 causes print engine 20 to record print jobs on web 19 as it is being drawn from supply roll 19A and wound to form imaged roll 19B. Processor 40 causes the creation of a print job representing a print job manifest and then causes that print job to be formed at or near the loose end of web 19 as it is wound to form imaged roll 19B. The print job manifest may be recorded anywhere on web 19 and multiple copies and/or versions of the manifest may be recorded at various positions along web 19. At least one copy can be recorded following the last print job to be included on imaged roll 19B so that the print job manifest can be recorded at or near the loose end of roll 19B. Depending on the length of web 19, this may require that web 19 be cut at a point following that print job manifest.

Figure 3:
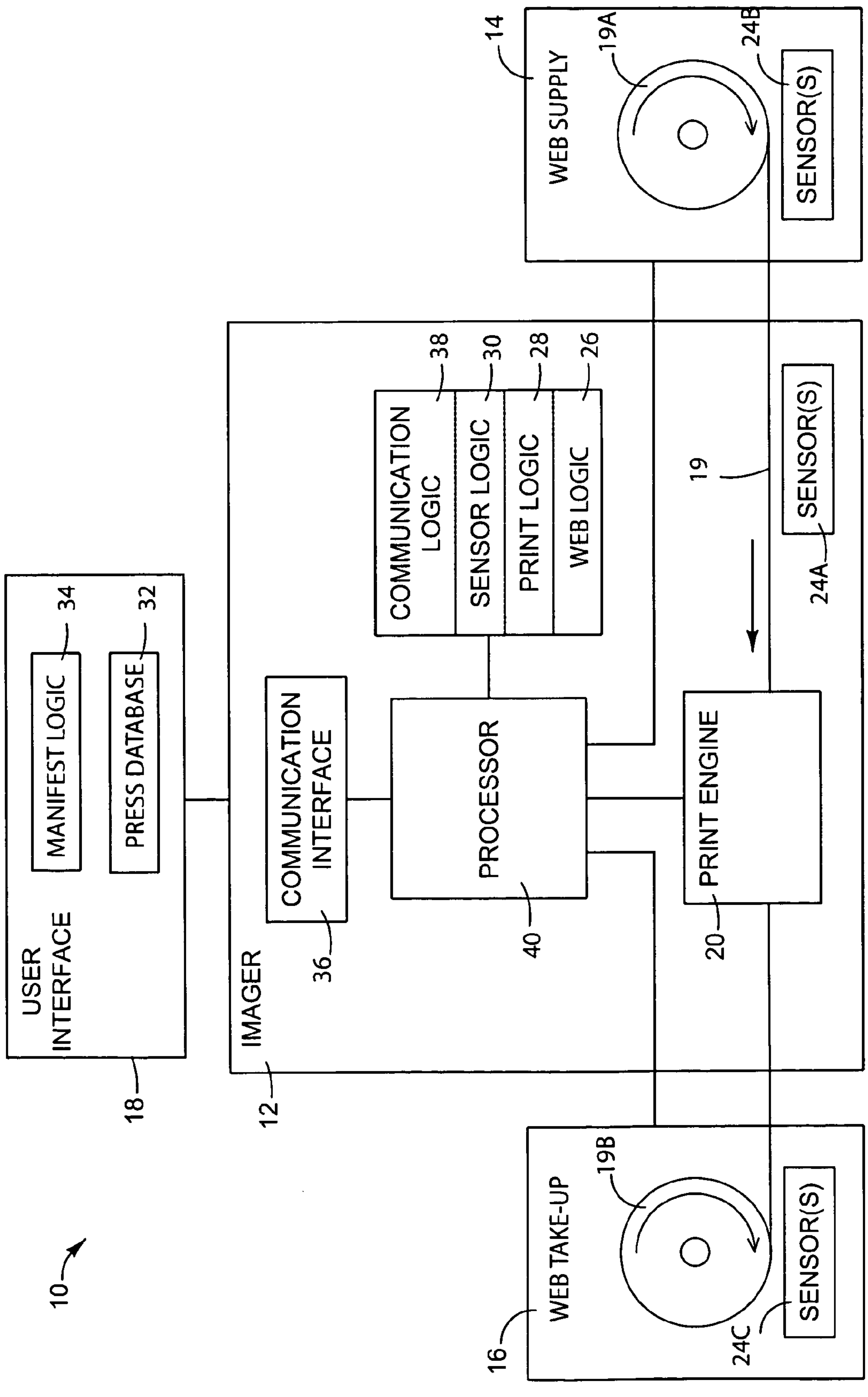
FIG. 3 is a block diagram illustrating logical and physical components operating on a digital press according to another embodiment.

A variation of digital press 10 is illustrated in the block diagram of FIG. 3. Here user interface 18 is illustrated as a separate computing device placed in network communication with digital press 10. In this example, manifest logic 34 and press database 32 are provided and maintained as a part of user interface 18.

FIG. 4 illustrates an example of manifest data stored in press database 32. In this example, the manifest data is a table containing roll entries 46. Each roll entry 46 contains manifest data for a different imaged roll such as imaged roll 19B—the particular roll is identified by data in roll field 48 of a given roll entry 46. Where a print job manifest recorded on a given imaged roll includes a machine readable code such as a bar code, that machine readable code may be encoded with data associated with roll entry 46 for that imaged roll. In this manner, an operator scanning the code in the print job manifest can be automatically be linked to and obtain data, examples of which are discussed below, from that roll entry 46 in press database 32.

Each roll entry 46 contains job entries 50 each containing manifest data for a particular print job. Each job entry 50 contains data in job field 52, parameters field 54, finishing field 56, and error field 58. Data in job field 52 identifies a particular print job. Data in parameters field 54 describes one or more parameters of a print job such as the number of copies and the number copies and the number of images per copy. For example, a particular print job may call for the production of ten twenty page manuals. Data in parameters field 54 for that print job may then indicate ten copies and twenty images per copy. Data in parameters field may also identify the position of a print job and or print jobs images on a web. For example, particular print job may start at position (X) measured from the loose end of a roll formed from a wound web.

Data in finishing field 56 identifies finishing operations to be performed with respect to a particular print job. Finishing operations can include cutting, binding, inserts, folding, trimming, collating, and a multitude of other actions. Data in errors field 58 identifies any errors incurred with respect to the print job. For example, sensor logic 30 may detect through use of sensor 24A that a given image was improperly recorded causing an additional copy of that image to be recorded on the web. Data in error field 58 for that print job would then identify that error and perhaps the presence of the additional image.

Figure 5:
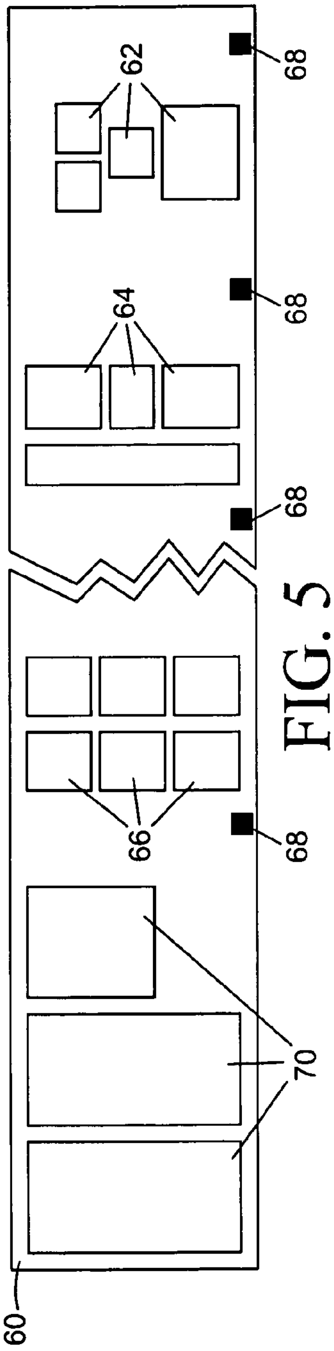
FIGS. 5-7 are schematic views of exemplary webs on which images have been recorded according to various embodiments.
Figure 6:
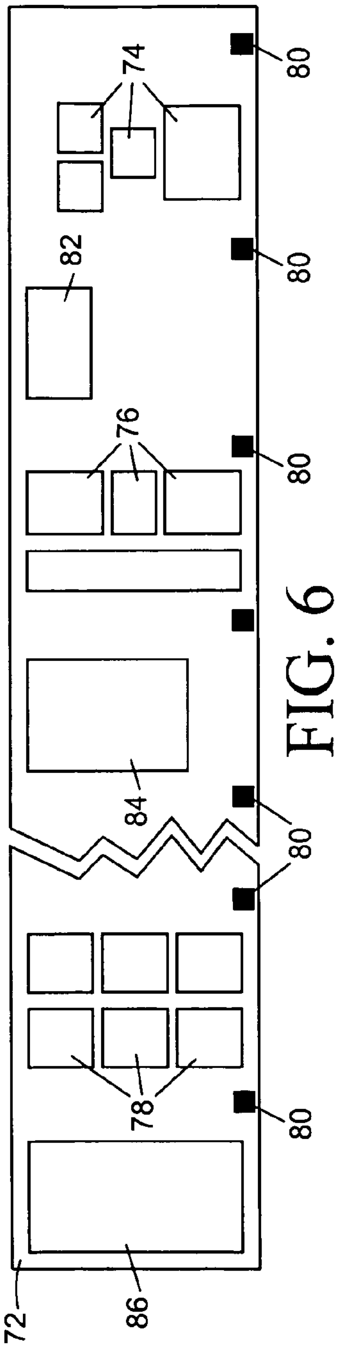
Figure 7:
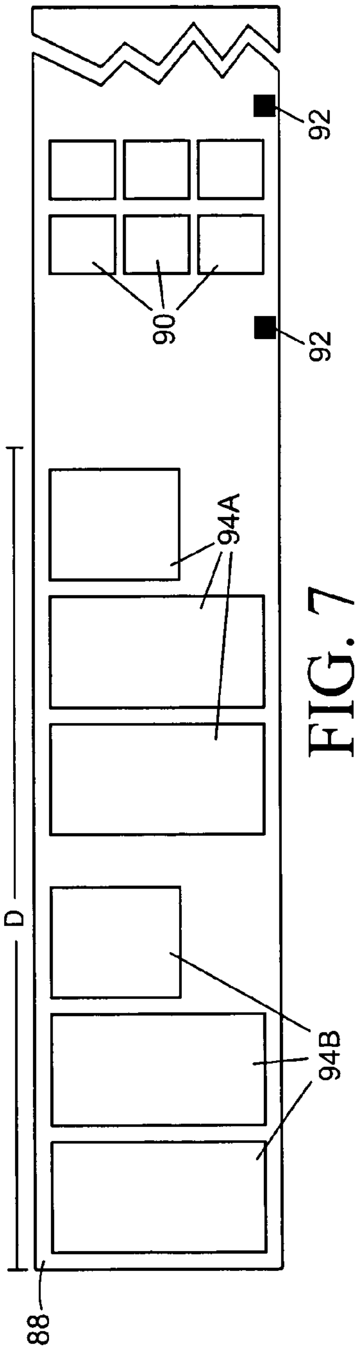

Print Job Manifest Examples: FIGS. 5-7 illustrate varying examples of the placement and use of print job manifests. Starting with FIG. 5, web 60 is shown to include print jobs 62-66, press marks 68, and print job manifest 70. Print jobs 62-66 are separated by press marks 68 that serve as indicators of where one print job ends and another starts. Each print job 62-66 includes one or more images recorded on web 60. A given image may be textual, graphical, or both. A given image may be a photo or a page for a book. While only one side of web 60 is shown, images may also be recorded on the opposing side (not shown).

A single copy of a three image print job 70 is recorded at an end of web 60 following print jobs 62-66. Print job manifest 70 includes information regarding print jobs 62-66. Again, that information can include print job names, the relative locations of each print job and its images along web 60, the number of images in each print job, finishing instructions, errors, and the like. As web 60 is wound to form a roll, print job manifest is placed at the loose end of the roll so that it can be easily accessed and viewed. Print job manifest 70 may be recorded on one or both sides of web 60. It may be advantageous in some cases to record print job manifest 70 on a side of web 60 that forms an outer surface as web 60 is wound to form an imaged roll. In this manner at least portion of print job manifest 70 remains exposed for viewing once web 60 is wound to form the imaged roll.

In FIG. 6, web 72 is shown to include print jobs 74-78, press marks 80 and print job manifests 82, 84, and 86. In this example, the manifests are cumulative. Print job manifest 82 includes information with respect to print job 74. Print job manifest 84 includes information with respect to print job 74 and print job 76. Print job manifest 86 includes information with respect to print job 74, print job 76, and print job 78. In this manner, web 72 can be cut at any point following a given print job manifest during processing as it is being unwound from a roll. The particular manifest 82, 84, or 86 left at the loose end of the roll will then contain information with respect to the print jobs remaining on that roll.

In FIG. 7, web 88 is shown to include print job 90, press marks 92 and print job manifest copies 94A and 94B. While not shown, web 88 includes other print jobs. Each print job manifest copy 94A and 94B includes information with respect to print job 90 and the other print jobs included on web 88. Print job manifest copies 94A and 94B span a distance (D) along web 88. That distance is selected to equal or exceed the circumference of the roll formed by winding web 88. In this manner, the multiple, duplicate print job manifests not only serve to provide information but to provide an outer skin that protects the contents of the roll. Here, two copies were required to span the distance (D). Depending on the length of web 88, its thickness and other factors, more or fewer copies may be required. In any event, the distance D can be calculated based on these discernable factors to determine the number of copies needed.

Figure 8:
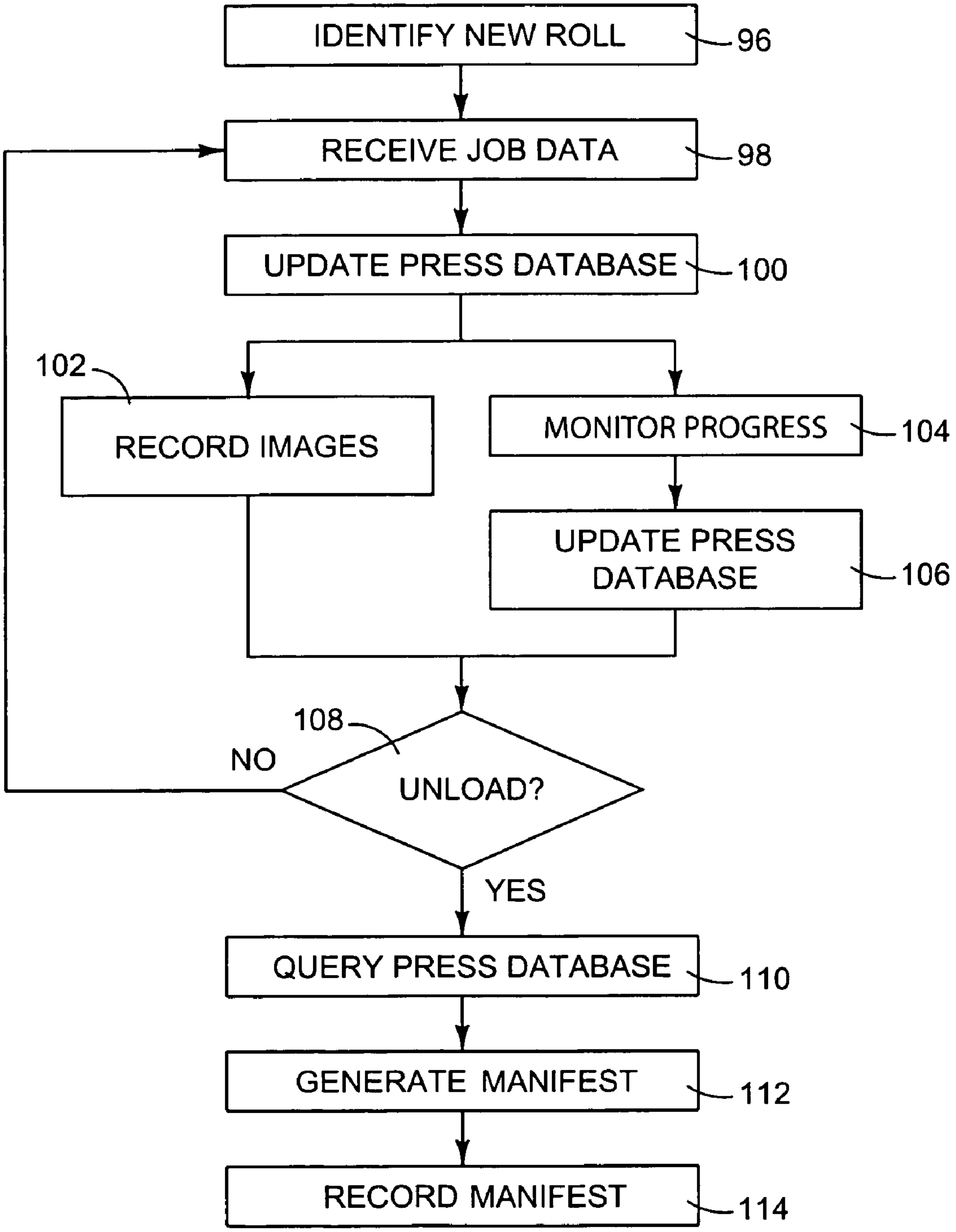
FIGS. 8-10 are exemplary flow diagrams illustrating steps for implementing various embodiments.

OPERATION: The operation of embodiments will now be described with reference to the flow diagrams of FIGS. 8-10. FIG. 8 is a flow diagram of exemplary acts performed recording a print job manifest according to an embodiment. Initially, a new supply roll is identified (step 96). A new supply roll is a supply roll from which a web will be drawn recorded on and then wound to form an imaged roll. Now that each time a web is cut, the remaining supply roll may be deemed a new supply roll. Step 96, for example, may be performed by WEB logic 26 (FIG. 2) which informs manifest logic 34 (FIG. 2) of the new supply roll (19A). Manifest logic 34 can then create a new corresponding roll entry 46 (FIG. 4) in press database 32.

Job data is received (step 98). Job data is electronic data instructing the production of a print job. It identifies the images to be recorded, the sequence, placement, and number of copies. It can also include finishing instructions and identifying information related to the print job's owner. Step 98, for example, could be performed by print logic 28 receiving the job data from a remote network source through communication interface 36.

The press database is then updated to reflect the job data received for the print job (step 100). This could involve print logic 28 providing manifest logic 34 with parameters of the print job and any other relevant information. Manifest logic 34 could then add a job entry 50 to the roll entry 46 created for the roll identified in step 96.

Figure 2:
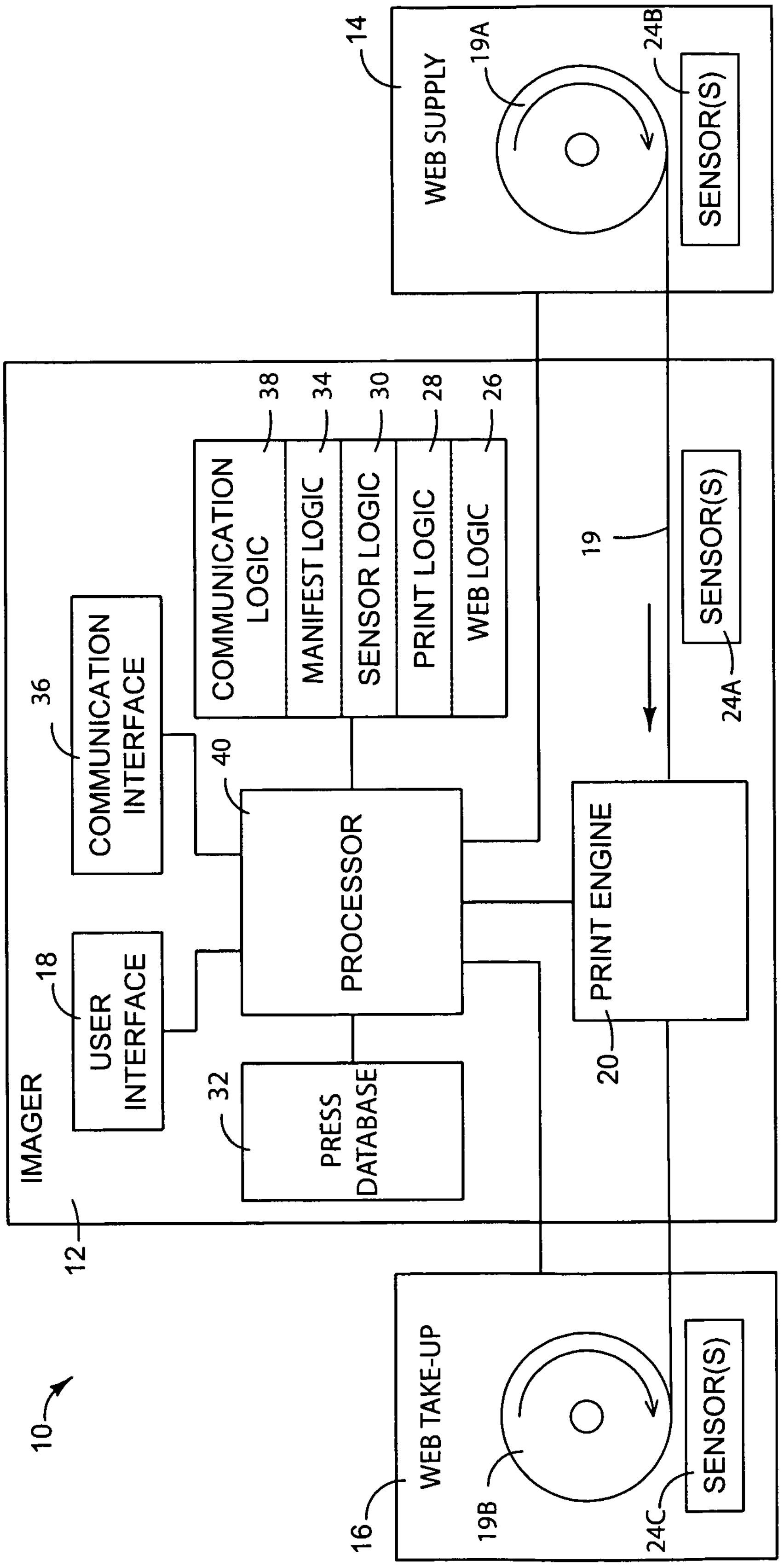
FIG. 2 is a block diagram illustrating logical and physical components operating on a digital press according to an embodiment.

Continuing with the example of FIG. 8, the process splits into two threads. In the first, images for the print job are recorded on the web (step 102). In the second, the progress of step 102 is monitored (step 104) and the press database is updated accordingly (step 106). Referring to FIG. 2, step 102 can involve print logic 28 instructing print engine 20 to record images in web 19 as roll logic 26 causes the web to be pulled through imager 12. Steps 104 and 106 can involve manifest logic 34 obtaining progress information WEB logic 26, print logic 28, and sensor logic 30 from sensor logic and then updating press database 32 accordingly.

Next it is determined if an unload instruction has been received (step 108). Referring again back to FIG. 2, a press operator, for example, may, through user interface 18 (FIG. 2) enter an instruction(s) that imaged roll 19B is to be unloaded from digital press 10. If no such instruction(s) are received, the process repeats with step 98. If unload instructions are received, web logic 26 informs manifest logic 34 that a print job for a print job manifest is to be generated and the process continues with step 110.

After receiving unload instructions in step 108, the press database is queried for information related to the imaged roll (step 110). Using that information, a print job for a print job manifest is generated (step 112). The print job manifest is then recorded on the web so that it is placed at or near the loose end of the imaged roll (step 114).

Figure 9:
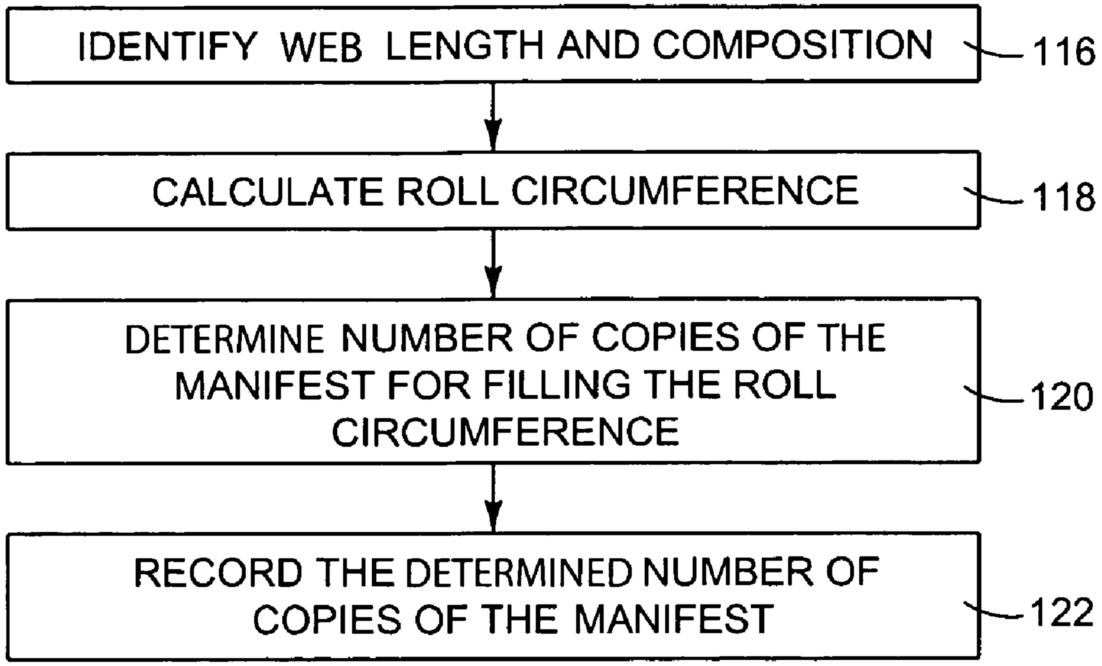

As discussed above with respect to FIG. 7, it may be desirable in some cases to record multiple copies of a print job manifest on a web so that the copies span an outer circumference of the imaged roll. FIG. 9 illustrates exemplary steps taken in such a case. The length of the web used to form the imaged and the composition of that web is identified (step 116). Referring back to FIG. 2, it may be presumed that digital press has knowledge of the composition of web 19, that is, the thickness and the material from which web 19 is made. For example, web 19 may be composed of from cloth of a given thickness. Instead web 19 may be made from paper, plastic or metal of a different thickness. As for the length, sensor logic 30 using sensor 24C may monitor that length of web 19 that is used to form imaged roll 19B and provide this information to manifest logic 34.

Using the information identified in step 116, the circumference of the imaged roll is calculated or at least estimated (step 118). Based on the circumference, the number of copies of the print job manifest required to span that circumference is determined (step 120). Steps 118 and 120, for example may be performed by manifest logic 34. The determined number of copies of the print manifest are then recorded on the web so that they are positioned at or near the loose end of the imaged roll (step 122).

Figure 10:
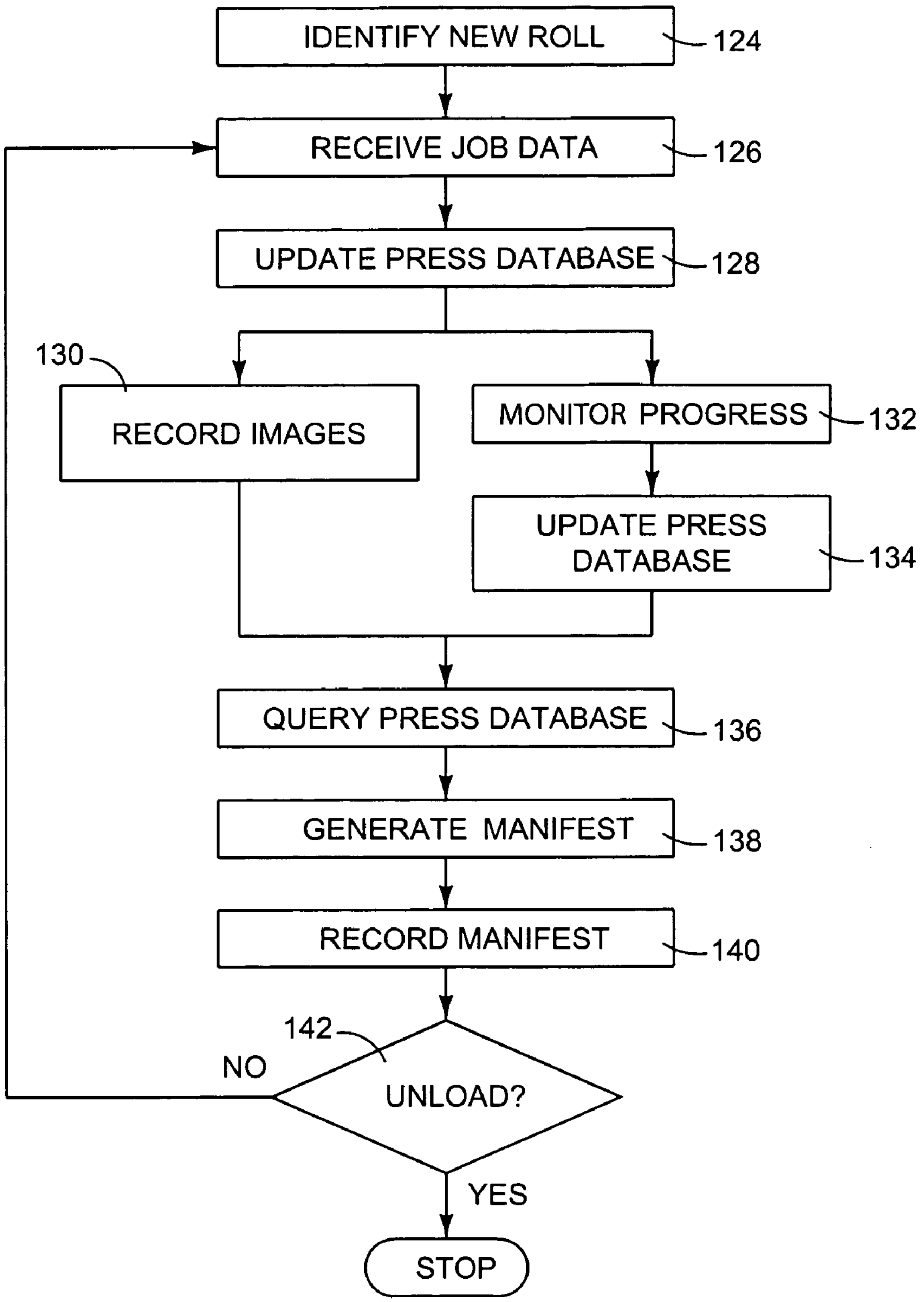

As discussed above with respect to FIG. 6, it may be desirable to record a cumulative print job manifest following each print job recorded on a web. FIG. 10 illustrates exemplary steps taken in such a case. Initially, a new supply roll is identified (step 124). Job data is received (step 126). As noted above, job data is electronic data instructing the production of a print job. It identifies the images to be recorded, the sequence, placement, and number of copied. It can also include finishing instructions and identifying information related to the print job's owner. The press database is then updated to reflect the job data received for the print job (step 128).

The process splits into two threads. In the first, images for the print job are recorded on the web (step 130). In the second, the progress of step 102 is monitored (step 132) and the press database is updated accordingly (step 134). The press database is queried for information related to the print jobs formed on the web (step 136). Using that information, a print job for a print job manifest is generated (step 138). The print job manifest is then recorded on the web so that it is placed following the previous print job (step 140).

Next it is determined if an unload instruction has been received (step 142). If no such instruction is received, the process repeats with step 126. If unload instructions are received, the process ends such that the last print job manifest recorded is located at or near the loose end of the imaged roll and contains information regarding all print jobs on the imaged roll.

CONCLUSION: The digital press 10 of FIG. 1 illustrates an exemplary environment in which embodiments may be implemented. Implementation, however, is not limited to digital press 10. The block diagrams of FIGS. 2-4 show the architecture, functionality, and operation of various embodiments of the present invention. A number of the blocks are defined at least in part as programs. Each of those blocks may represent in whole or in part a module, segment, or portion of code that comprises one or more executable instructions to implement the specified logical function(s). Each block may also represent a circuit or a number of interconnected circuits to implement the specified logical function(s).

Also, the present invention can be embodied at least in part, in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes, hard drives or a portable compact disc.

Although the flow diagrams of FIGS. 8-10 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for providing a print job manifest comprising:

querying, by a processor executing program instructions stored on a tangible computer-readable medium, a press database containing data corresponding to print jobs recorded on a web;

generating, by the processor executing the program instructions, the print job manifest according to the press database;

recording, by the processor executing the program instructions, the print job manifest on the web so that at least a portion of the manifest is located generally adjacent to a loose end of the web when the web is wound to form a roll, wherein recording comprises recording a sufficient plurality of copies of the print job manifest on the web so that the plurality of copies spans a length of the web at least equal to a circumference of the roll.

2. The method of claim 1, wherein recording comprises recording the print job manifest on the web so that at least the portion of the print job manifest formed on the web remains exposed for viewing once the web is finished being wound to form the roll.

3. The method of claim 1, further comprising periodically updating the press database with data corresponding to print jobs being recorded on the web.

4. The method of claim 1, wherein the acts of querying, generating, and recording are performed following receipt of an instruction to unload the web.

5. The method of claim 1, wherein generating and recording comprise, for each print job formed on the web, generating and recording a cumulative print job manifest with that print job on the web, wherein at least a portion of one cumulative manifest formed on the web is located generally adjacent to the loose end of the web when the web is wound to form the roll.

6. The method of claim 1, wherein generating comprises generating the print job manifest that includes a code associated with a corresponding roll entry in the press database.

7. The method of claim 1 wherein generating comprises generating the print job manifest that includes data identifying jobs recorded on the web, one or more parameters for each of those jobs, and finishing instructions, if any, for the jobs.

8. The method of claim 1 wherein generating comprises generating the print job manifest that includes data identifying any errors incurred when recording the print jobs on the web.

9. A printing method, comprising:

receiving job data for a plurality of print jobs;

updating a press database to reflect the job data;

recording the print jobs on a web according to the job data;

at least periodically monitoring progress of recording the print jobs and updating the press database to reflect the progress; and upon receiving instructions to unload the web:

querying the press database containing the job data corresponding to print jobs recorded on the web;

generating a print job manifest according to the press database; and recording the print job manifest on the web so that at least a portion of the manifest is located generally adjacent to a loose end of the web when the web is wound to form a roll, wherein recording comprises recording a sufficient plurality of copies of the print job manifest on the web so that the plurality of copies spans a length of the web at least equal to a circumference of the roll.

10. A tangible computer readable medium having computer executable instructions for:

querying a press database containing data corresponding to print jobs recorded on a web;

generating a print job manifest according to the press database;

causing the print job manifest to be recorded on the web so that at least a portion of the print job manifest is located generally adjacent to a loose end of the web when the web is wound to form a roll, wherein the instructions for causing the print job manifest to be recorded on the web include instructions for recording a sufficient plurality of copies of the print job manifest on the web so that the plurality of copies spans a length of the web at least equal to a circumference of the roll.

11. The medium of claim 10, wherein the instructions for causing the print job manifest to be recorded on the web include instructions for recording the print job manifest on the web so that at least the portion of the print job manifest formed on the web remains exposed for viewing once the web is finished being wound to form the roll.

12. The medium of claim 10, having further instructions for periodically updating the press database with data corresponding to print jobs being recorded on the web.

13. The medium of claim 10, wherein the medium includes instructions for executing the instructions for querying, generating, and recording include following receipt of an instruction to unload the web.

14. The medium of claim 10, wherein the instructions for generating and for causing the print job manifest to be recorded on the web include instructions for, for each print job formed on the web, generating and recording a cumulative print job manifest with that print job on the web, wherein at least a portion of one cumulative manifest formed on the web is located generally adjacent to the loose end of the web when the web is wound to form the roll.

15. The medium of claim 10, wherein the instructions for generating include instructions for generating the print job manifest that includes a code associated with a corresponding roll entry in the press database.

16. The medium of claim 10, wherein the instructions for generating include instructions for generating the print job manifest that includes data identifying jobs recorded on the web, one or more parameters for each of those jobs, and finishing instructions, if any, for the jobs.

17. The medium of claim 10, wherein the instructions for generating include instructions for generating the print job manifest that includes data identifying any errors incurred when recording the print jobs on the web.

18. A tangible computer readable medium having computer executable instructions for:

receiving job data for a plurality of print jobs;

updating a press database to reflect the job data;

causing the print jobs to be recorded on a web according to the job data;

at least periodically monitoring a progress of recording the print jobs and updating the press database to reflect the progress; and upon receiving instructions to unload the web:

querying the press database containing the job data corresponding to print jobs recorded on the web;

generating a print job manifest according to the press database; and causing the print job manifest to be recorded on the web so that at least a portion of the manifest is located generally adjacent to a loose end of the web when the web is wound to form a roll, wherein the instructions for causing the print job manifest to be recorded on the web include instructions for recording a sufficient plurality of copies of the print job manifest on the web so that the plurality of copies spans a length of the web at least equal to a circumference of the roll.

19. A system for providing a print job manifest comprising:

manifest logic stored on a tangible computer readable medium and operable to query a press database containing data corresponding to print jobs recorded on a web and generate the print job manifest according to the press database; and print logic operable stored on the tangible computer readable medium and to cause the print job manifest to be recorded on the web so that at least a portion of the manifest is located generally adjacent to a loose end of the web when the web is wound to form a roll, wherein the manifest logic and the print logic are operable to cause a sufficient plurality of copies of the print job manifest to be recorded on the web so that the plurality of copies spans a length of the web at least equal to a circumference of the roll.

20. The system of claim 19, wherein the print logic is operable to cause the print job manifest to be recorded on the web so that at least a portion of the print job manifest formed on the web remains exposed for viewing once the web is wound to form the roll.

21. The system of claim 19, wherein the manifest logic is operable to periodically update the press database with data corresponding to print jobs being recorded on the web.

22. The system of claim 19, wherein the manifest logic and print logic are configured to perform their respective tasks following receipt of an instruction to unload the web.

23. The system of claim 19, wherein the manifest logic and print logic are configured to perform their respective tasks for each print job formed on the web, wherein each print job manifest generated by the manifest logic is a cumulative manifest and wherein at least a portion of one cumulative manifest formed on the web is located generally adjacent to the loose end of the web when the web is wound to form the roll.

24. The system of claim 19, wherein the manifest logic is operable to generate the print job manifest that includes a code associated with a corresponding roll entry in the press database.

25. The system of claim 19 wherein the manifest logic is operable to generate the print job manifest that includes data identifying jobs recorded on the web, one or more parameters for each of those jobs, and finishing instructions, if any, for the jobs.

26. The system of claim 19 wherein the manifest logic is operable to generate the print job manifest that includes data identifying any errors incurred when recording the print jobs on the web.

27. A printing system, comprising:

a print engine operable to record images on a web;

communication logic stored on a tangible computer readable medium and operable to receive print jobs;

print logic operable stored on the tangible computer readable medium and to cause the print engine to record images on the web as defined by the print jobs;

manifest logic stored on the tangible computer readable medium and operable to update a press database to include data corresponding to print jobs recorded on a web and to query the press database for that data and generate a print job manifest according to results of a query of the press database; and wherein the print logic is operable to cause the print engine to record the print job manifest on the web so that at least a portion of the manifest is located generally adjacent to a loose end of the web when the web is wound to form a roll, and wherein the manifest logic and the print logic are operable to cause a sufficient plurality of copies of the print job manifest to be recorded on the web so that the plurality of copies spans a length of the web at least equal to a circumference of the roll.

* * * * *